(12) United States Patent
McCourt et al.

(10) Patent No.: US 11,704,567 B2
(45) Date of Patent: Jul. 18, 2023

(54) SYSTEMS AND METHODS FOR AN ACCELERATED TUNING OF HYPERPARAMETERS OF A MODEL USING A MACHINE LEARNING-BASED TUNING SERVICE

(71) Applicant: Intel Corporation, Santa Clara, CA (US)

(72) Inventors: Michael McCourt, San Francisco, CA (US); Ben Hsu, San Francisco, CA (US); Patrick Hayes, San Francisco, CA (US); Scott Clark, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 928 days.

(21) Appl. No.: 16/511,320

(22) Filed: Jul. 15, 2019

(65) Prior Publication Data
US 2020/0019888 A1   Jan. 16, 2020

Related U.S. Application Data

(60) Provisional application No. 62/697,578, filed on Jul. 13, 2018.

(51) Int. Cl.
*G06N 3/082* (2023.01)
*G06N 20/00* (2019.01)
*G06N 20/20* (2019.01)

(52) U.S. Cl.
CPC ............ *G06N 3/082* (2013.01); *G06N 20/00* (2019.01); *G06N 20/20* (2019.01)

(58) Field of Classification Search
CPC ......... G06N 99/00; G06N 7/005; G06N 3/082
See application file for complete search history.

(56) References Cited

U.S. PATENT DOCUMENTS

| 7,363,281 | B2 | 4/2008 | Jin et al. |
| 8,364,613 | B1 | 1/2013 | Lin et al. |
| 9,786,036 | B2 | 10/2017 | Annapureddy |
| 10,217,061 | B2 * | 2/2019 | Hayes .................... G06N 5/003 |

(Continued)

FOREIGN PATENT DOCUMENTS

WO   2018213119   11/2018

OTHER PUBLICATIONS

United States Patent and Trademark Office, "Non-Final Office Action," dated Jul. 5, 2018 in connection with U.S. Appl. No. 15/977,168, 13 pages.

(Continued)

*Primary Examiner* — Vincent H Tran
(74) *Attorney, Agent, or Firm* — Hanley, Flight and Zimmerman, LLC

(57) ABSTRACT

A system and method for accelerated tuning of hyperparameters includes receiving a multi-task tuning work request for tuning hyperparameters of a model, wherein the multi-task tuning work request includes: a full tuning task for tuning hyperparameters, wherein the full tuning task includes a first set of tuning parameters governing a first tuning operation; a partial tuning task for tuning the hyperparameters of the model, wherein the partial tuning task includes a second distinct set of tuning parameters governing a second tuning operation; executing the first tuning operation and the second tuning operation; generating a first suggestion set and a second suggestion set of one or more proposed values for the hyperparameters based on the execution of the full tuning task and the partial tuning task; and setting the partial tuning task as a proxy for the full tuning task thereby accelerating a tuning of the hyperparameters of the model.

16 Claims, 4 Drawing Sheets

(56) References Cited

U.S. PATENT DOCUMENTS

| | | | |
|---|---|---|---|
| 10,282,237 | B1 | 5/2019 | Johnson et al. |
| 10,360,517 | B2* | 7/2019 | Koch .................... G06N 3/126 |
| 10,379,913 | B2 | 8/2019 | Johnson et al. |
| 10,445,150 | B1 | 10/2019 | Johnson et al. |
| 10,528,891 | B1 | 1/2020 | Cheng et al. |
| 10,558,934 | B1 | 2/2020 | Cheng et al. |
| 10,565,025 | B2 | 2/2020 | Johnson et al. |
| 10,607,159 | B2 | 3/2020 | Hayes et al. |
| 10,621,514 | B1 | 4/2020 | Cheng et al. |
| 10,740,695 | B2 | 8/2020 | Cheng et al. |
| 11,301,781 | B2 | 4/2022 | Hayes et al. |
| 2007/0019065 | A1 | 1/2007 | Mizes |
| 2008/0183648 | A1 | 7/2008 | Goldberg et al. |
| 2009/0244070 | A1 | 10/2009 | Mattikalli et al. |
| 2010/0083196 | A1 | 4/2010 | Liu |
| 2015/0288573 | A1 | 10/2015 | Baughman et al. |
| 2016/0110657 | A1 | 4/2016 | Gibiansky et al. |
| 2016/0132787 | A1* | 5/2016 | Drevo .................... G06N 20/10 706/12 |
| 2016/0232540 | A1 | 8/2016 | Gao et al. |
| 2017/0124487 | A1 | 5/2017 | Szeto et al. |
| 2018/0121797 | A1 | 5/2018 | Prabhu et al. |
| 2018/0121814 | A1* | 5/2018 | Yu ............................ G06N 3/04 |
| 2018/0129892 | A1 | 5/2018 | Bahl et al. |
| 2018/0240041 | A1 | 8/2018 | Koch et al. |
| 2018/0356949 | A1 | 12/2018 | Wang et al. |
| 2019/0019108 | A1* | 1/2019 | Eads ........................ G06N 20/00 |
| 2019/0095785 | A1* | 3/2019 | Sarkar ...................... G06N 3/08 |
| 2019/0220755 | A1 | 7/2019 | Carbune et al. |
| 2019/0236487 | A1* | 8/2019 | Huang .................... G06N 20/00 |
| 2019/0370684 | A1* | 12/2019 | Gunes .................... G06N 20/00 |
| 2020/0151029 | A1 | 5/2020 | Johnson et al. |
| 2020/0226496 | A1* | 7/2020 | Basu ....................... G06F 17/18 |
| 2020/0302234 | A1* | 9/2020 | Walters .................. G06N 7/005 |
| 2020/0302342 | A1 | 9/2020 | Cheng et al. |

OTHER PUBLICATIONS

United States Patent and Trademark Office, "Notice of Allowance," dated Nov. 28, 2018 in connection with U.S. Appl. No. 15/977,168, 5 pages.

United States Patent and Trademark Office, "Non-Final Office Action," dated Sep. 11, 2019 in connection with U.S. Appl. No. 16/243,361, 10 pages.

United States Patent and Trademark Office, "Notice of Allowance," dated Dec. 31, 2019 in connection with U.S. Appl. No. 16/243,361, 7 pages.

International Searching Authority, "International Preliminary Report on Patentability," dated Nov. 19, 2019 in connection with International Patent Application No. PCT/US2018/032248, 8 pages.

International Search Report and Written Opinion for International Application No. PCT/US18/32248 dated Jul. 30, 2018.

Bergstra , et al., "Hyperopt: A Python Library for Model Selection and Hyperparameter Optimization", Computational Science & Discovery, Aug. 2015.

Zhou, Zongzhao , et al., "Combining Global and Local Surrogate Models to Accelerate Evolutionary Optimization", IEEE Transactions on Systems, Man, and Cybernetics—Part C: Application and Reviews, vol. 37, No. 1, Jan. 2007.

United States Patent and Trademark Office, "Non-Final Office Action," dated Aug. 25, 2020 in connection with U.S. Appl. No. 16/796,489, 10 pages.

United States Patent and Trademark Office, "Final Office Action," dated Mar. 12, 2021 in connection with U.S. Appl. No. 16/796,489, 10 pages.

United States Patent and Trademark Office, "Notice of Allowance," dated Sep. 9, 2021 in connection with U.S. Appl. No. 16/796,489, 5 pages.

United States Patent and Trademark Office, "Notice of Allowance," dated Dec. 7, 2021 in connection with U.S. Appl. No. 16/796,489, 5 pages.

European Patent Office, "Communication Pursuant to Rules 70(2) and 70a(2) EPC," dated Apr. 13, 2021 in connection with European Patent Application No. 18801697.6, 1 page.

European Patent Office, "Extended European Search Report," dated Mar. 24, 2021 in connection with European Patent Application No. 18801697.6, 9 pages.

European Patent Office, "Communication Pursuant to Article 94(3) EPC," dated Apr. 5, 2023 in connection with European Patent Application No. 18801697.6, 5 pages.

* cited by examiner

200

Configuring A Multi-Task Tuning Request 210

Executing A Multi-Task Tuning Request S220

Generating A Plurality of Suggestions S230

Implementing An Assessment of Observations S240

Tuning A Subject Model S250

SYSTEMS AND METHODS FOR AN ACCELERATED TUNING OF HYPERPARAMETERS OF A MODEL USING A MACHINE LEARNING-BASED TUNING SERVICE

CROSS-REFERENCE TO RELATED APPLICATIONS

This application claims the benefit of U.S. Provisional Application No. 62/697,578, filed 13 Jul. 2018, which is incorporated herein in its entirety by this reference.

TECHNICAL FIELD

The inventions relate generally to the computer optimization and machine learning fields, and more specifically to a new and useful application program interface and intelligent hyperparameter optimization in the computer optimization and machine learning fields.

BACKGROUND

Modern machine learning capabilities are rapidly changing and improving how some of the most complex and data-intensive computing problems are solved. A performance of a machine learning model is governed mainly in the manner(s) in which the machine learning model is trained using data samples as machine learning training input and based on the hyperparameters of the machine learning model set prior to the training of the model. As referenced in passing the hyperparameters of the machine learning models are parameters whose values are set prior to the commencement of the machine learning process rather than derived by the machine learning model during training. Example include the number of trees in a random forest or the number of hidden layers in a deep neural net. Adjusting the values of the hyperparameters of a machine learning model by any amount typically results in a large impact on a performance of the machine learning model.

However, many existing machine learning models are not implemented with optimal hyperparameters well-suited for achieving the best predictive performances. Rather, the many existing machine learning models are implemented with default hyperparameters that have not been optimized for a specific computing problem for which the machine learning models are being used.

Additionally, any existing system that enables optimization of hyperparameters of a machine learning model typically includes an extremely complex interface that may require significant coding capabilities and comprehension of the underlying software and hardware components of the system. Thus, making it difficult to efficiently and effectively enable optimizations and subsequent improvements of the machine learning models.

Thus, there is a need in the machine learning field to create an improved optimization platform to test and improve machine learning models (e.g., in-product machine learning models) and an associated Application Program Interface that enables developers to efficiently and effectively interact with a robust system implementing the evaluation framework. The embodiments of the present application described herein provide technical solutions that address, at least, the need described above, as well as the technical deficiencies of the state of the art described throughout the present application.

SUMMARY OF THE INVENTION(S)

Figure 1:
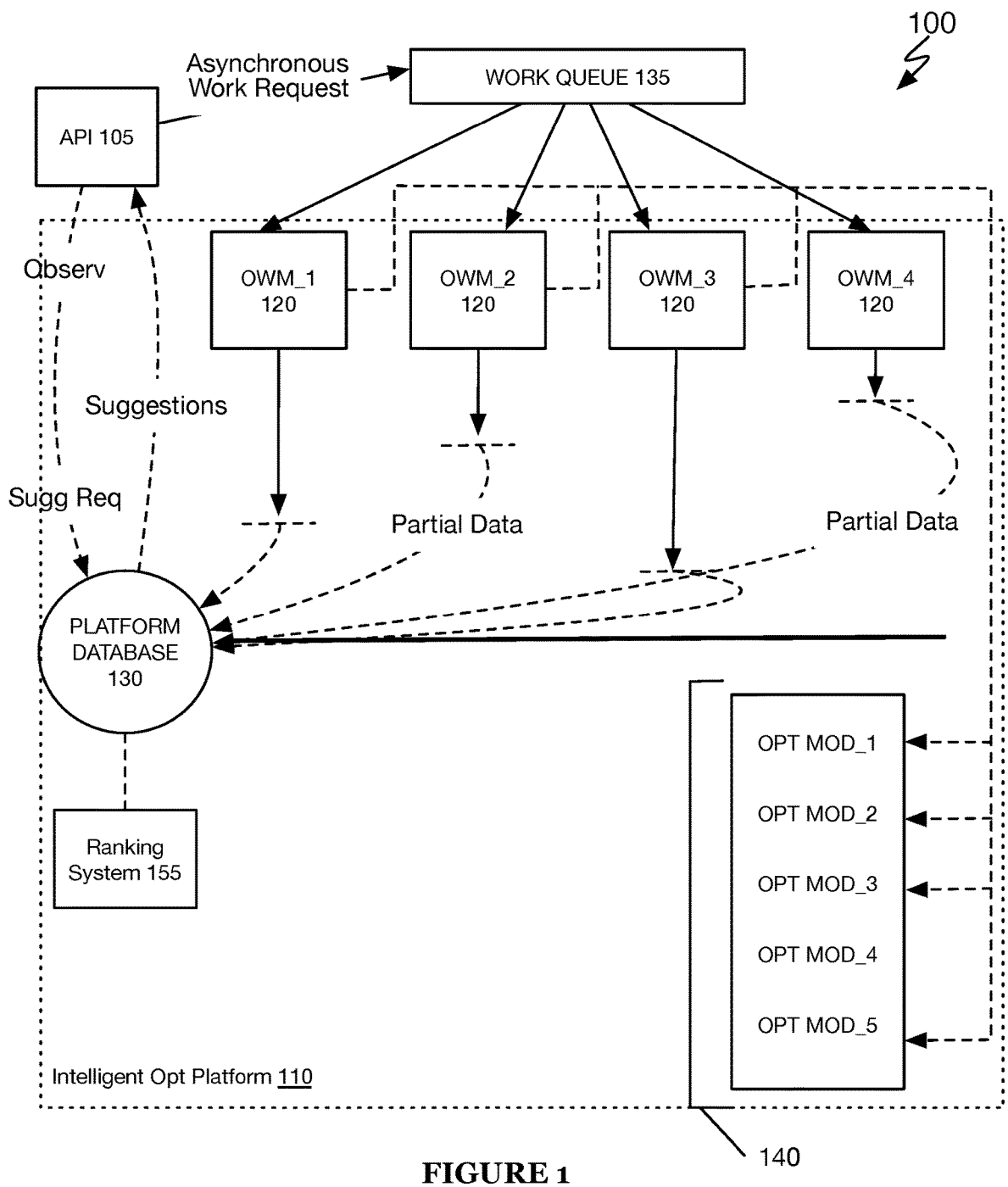
FIG. 1 illustrates a schematic representation of a system in accordance with one or more embodiments of the present application.

In one embodiment, a system for accelerated tuning of hyperparameters for improving a computational performance of a model includes a remote tuning service for tuning hyperparameters of a model of a subscriber to the remote tuning service, wherein the remote tuning service is hosted on a distributed network of computers that: receives a multi-task tuning work request for tuning hyperparameters of a model of a subscriber to the remote tuning service, wherein the multi-task tuning work request includes: a full tuning task for tuning hyperparameters of the model, wherein the full tuning task includes a first set of tuning parameters governing a first tuning operation of the remote tuning service; a partial tuning task for tuning the hyperparameters of the model, wherein the partial tuning task includes a second distinct set of tuning parameters governing a second tuning operation of the remote tuning service; executes the first tuning operation of the full tuning task based on the first set of tuning parameters; executes the second tuning operation of the partial tuning task based on the second set of tuning parameters; generates a first suggestion set comprising one or more proposed values for the hyperparameters based on the execution of the full tuning task; generates a second suggestion set comprising one or more proposed values for the hyperparameters based on the execution of the partial tuning task, wherein if an identified performance metric of the model using the one or more proposed values for the hyperparameters derived from the execution of the partial tuning task satisfies a performance threshold, setting the partial tuning task as a proxy for the full tuning task thereby accelerating a tuning of the hyperparameters of the model.

In one embodiment, the second tuning operation of the partial tuning task is an abbreviated tuning operation relative to the first tuning operation of the full tuning task, wherein the abbreviated tuning operation requires one or more of less time for execution and less computing resources for execution.

In one embodiment, the remote tuning service further: collects observation data comprising a real-world performance of the one or more proposed values for the hyperparameters of the second suggestion set.

In one embodiment, the system includes an application programming interface that is in operable communication with the remote tuning service and that: configures the multi-task tuning request, wherein configuring the multi-task tuning request includes: defining the first set of tuning parameters for the full tuning task, and defining the second set of tuning parameters for the partial tuning task.

In one embodiment, the first set of tuning parameters for the full tuning task includes a tuning cost parameter having an integer value; and the second set of tuning parameters for the partial tuning task includes a tuning cost parameter having a non-integer value.

In one embodiment, the remote tuning service further: during the first tuning operation, provides as input for tuning the model an entire corpus of training data based on the one or more tuning parameters of the full tuning task; and during the second tuning operation, samples a subset of the corpus of training data as input for tuning the model based on the one or more tuning parameters of the partial tuning task.

In one embodiment, the first tuning operation for the full tuning task is performed jointly with the second tuning operation for the partial tuning task.

In one embodiment, the remote tuning service further: simultaneously assesses each of the one or more proposed values for the hyperparameters of the second suggestion set thereby accelerating the tuning of the hyperparameters of the model.

In one embodiment, the remote tuning service further: constructs a surrogate model that is an approximation of the model of the subscriber, wherein assessing each of the one or more proposed values for the hyperparameters of the second suggestion is performed via the surrogate model.

In one embodiment, when the partial tuning task is set as the proxy for the full tuning task, searching only a parameter space of the partial tuning task for new proposed values for the hyperparameters of the model.

In one embodiment, the remote tuning service further: during the first tuning operation, provides as input for tuning the model a predetermined number of epochs based on the one or more tuning parameters of the full tuning task; and during the second tuning operation, a number of epochs less than the predetermined number of epochs as input for tuning the model based on the one or more tuning parameters of the partial tuning task.

In one embodiment, a method for accelerated tuning of hyperparameters for improving a computational performance of a model includes receiving at a remote tuning service a multi-task tuning work request for tuning hyperparameters of a model of a subscriber to the remote tuning service, wherein the multi-task tuning work request includes: a full tuning task for tuning hyperparameters of the model, wherein the full tuning task includes a first set of tuning parameters governing a first tuning operation of the remote tuning service; a partial tuning task for tuning the hyperparameters of the model, wherein the partial tuning task includes a second distinct set of tuning parameters governing a second tuning operation of the remote tuning service; executing the first tuning operation of the full tuning task based on the first set of tuning parameters; executing the second tuning operation of the partial tuning task based on the second set of tuning parameters; generating a first suggestion set comprising one or more proposed values for the hyperparameters based on the execution of the full tuning task; generating a second suggestion set comprising one or more proposed values for the hyperparameters based on the execution of the partial tuning task, wherein if an identified performance metric of the model using the one or more proposed values for the hyperparameters derived from the execution of the partial tuning task satisfies a performance threshold, setting the partial tuning task as a proxy for the full tuning task thereby accelerating a tuning of the hyperparameters of the model.

In one embodiment, the method includes implementing an application programming interface that is in operable communication with the remote tuning service and that: configures the multi-task tuning request, wherein configuring the multi-task tuning request includes: defining the first set of tuning parameters for the full tuning task, and defining the second set of tuning parameters for the partial tuning task.

In one embodiment, the first set of tuning parameters for the full tuning task includes a tuning cost parameter having an integer value; and the second set of tuning parameters for the partial tuning task includes a tuning cost parameter having a non-integer value.

In one embodiment, when the partial tuning task is set as the proxy for the full tuning task, searching only a parameter space of the partial tuning task for new proposed values for the hyperparameters of the model.

In one embodiment, the method includes dynamically rebalancing by the tuning service exploration parameters and exploitation parameters of the second tuning operation based on one or more rebalancing factors associated with the partial tuning task.

In one embodiment, a method for accelerated tuning of hyperparameters of a machine learning model for improved computational performance includes receiving at a machine learning-based tuning service a multi-task tuning work request for tuning hyperparameters of a machine learning model of a subscriber to the machine learning-based tuning service, wherein the multi-task tuning work request includes: a unabridged tuning task for tuning hyperparameters of the machine learning model, wherein the unabridged tuning task includes a first set of tuning parameters governing a first tuning operation of the remote tuning service; an abridge tuning task for tuning the hyperparameters of the machine learning model, wherein the abridge tuning task includes a second distinct set of tuning parameters governing a second tuning operation of the remote tuning service; executing the first tuning operation of the unabridged tuning task based on the first set of tuning parameters; executing the second tuning operation of the abridge tuning task based on the second set of tuning parameters; generating a first suggestion set comprising one or more proposed values for the hyperparameters based on the execution of the unabridged tuning task; generating a second suggestion set comprising one or more proposed values for the hyperparameters based on the execution of the abridge tuning task, wherein if an identified performance metric of the machine learning model using the one or more proposed values for the hyperparameters derived from the execution of the abridge tuning task satisfies a performance threshold, setting the abridge tuning task as a proxy for the unabridged tuning task thereby accelerating a tuning of the hyperparameters of the machine learning model.

In one embodiment, at each instance that a suggestion set is generated for either of the unabridged tuning task or the full task, the remote tuning service: electronically associates the suggestion set to either the full task or the partial task, based on an assessment of data associated with the suggestion set, (a) performs a new tuning operation by selecting one of the full task and the partial task and (b) selectively samples a source of data for the new tuning operation.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

As discussed above, existing machine learning models tend to lack in predictive performance as well as speed in computation due to a lack of optimal hyperparameters used in the machine learning models during training. The lack of optimized hyperparameters well-suited to an underlying computing problem or the like adversely affect the computational capabilities of the machine learning model, in that, the resulting predictions or solutions of the model may not be accurate and the speed of computation of the machine learning model may be slow because the un-optimized or poorly optimized hyperparameters of the model may result in an increased workload (e.g., increased required computer processing, increased required data storage, etc.) to the computing system implementing the model and thereby resulting in many efficiencies therein.

Additionally, even in the circumstance that an attempt is made to optimize some of the hyperparameters of a machine learning model, the attempt to optimize the hyperparameters may fail due to many common optimization errors including: using inappropriate metrics and assumptions to test hyperparameters of an associated machine learning model or the like; overfitting a machine learning model during training that often results in a poor fit of the model to out of sample data or unseen data; using too few hyperparameters and failing to optimize all hyperparameters of a machine learning model; unskilled or improper hand-tuning, which is a highly inefficient optimization strategy at which humans are poor at performing high dimensional, non-convex optimization; grid searching over a space of possible hyperparameters which may grow the number of times a machine learning model must be evaluated due to an increase in dimensionality (i.e., increased hyperparameters); random searching which uses no intelligence in the optimization method and may result in unnecessarily high variance.

Accordingly, unintelligent optimization attempts of hyperparameters (or other model parameters) may result in high computational costs (e.g., high computer processing resources expenditures, etc.).

The embodiments of the present application, however, provide an intelligent optimization platform that functions to optimize hyperparameters and/or parameters of any type of model with significantly fewer evaluation thereby saving computational resources while greatly improving an overall performance of a model. In embodiments of the present application, the intelligent optimization platform includes an ensemble of parameter optimization models, which may include a combination of several distinct machine learning models and Bayesian optimization algorithms that may work in selective combinations to expediently tune hyperparameters or various parameters of complex external systems, simulations, and models.

Further, the embodiments of the present application include an intuitive and simplified Application Programming Interface (API) that enables users and/or developers to easily configure a work request, such as a hyperparameter optimization work request. A hyperparameter optimization work request as referred to herein generally relates to a request to optimize one or more hyperparameters of a model. The hyperparameter optimization work request may include an identification of the hyperparameters a user desires to optimize together with constraints or parameters required for experimenting or performing optimization trials using the system and/or methods described herein. The optimization work request may generally be generated using an API of the system 100, as described below. In a preferred embodiment, the optimization work request functions to trigger an operation of the intelligent optimization platform performing computations using the hyperparameters of the optimization work request. Additionally, in embodiments of the present application, using a limited number of simplified API calls, it is possible to integrate the sophisticated ensemble of Bayesian optimization techniques of the intelligent optimization platform to augment an existing machine learning pipeline.

Collaboratively, the intelligent optimization platform preferably functions to improve the computational capabilities of a machine learning model, such that the machine learning model performs at high levels of accuracy and further, computes predictions, suggestions, and other outcomes faster (e.g., up to one hundred times faster or more improvement in machine learning models, etc.) than un-optimized or poorly optimized machine learning models or other models. This, in turn, improves the functionality and operational speed and efficiency of the underlying computing system executing the machine learning model or other model.

1. System for Implementing an Intelligent API

As shown in FIG. 1, a system 100 includes an intelligent application program interface (API) 105, an intelligent model optimization platform 110, a plurality of queue working machines 120, a platform database 130, a shared work queue 135, and an ensemble of optimization models 140.

The system 100 preferably implements an intelligent model optimization platform 110 including an ensemble of Bayesian optimization processes and machine learning techniques that functions to automate an optimization of features of a model, architecture of a model, and hyperparameters of a model using an ensemble of Bayesian optimization techniques, as described in U.S. Pat. No. 10,217,061, which is incorporated herein in its entirety by this reference.

The system 100 functions to implement an intelligent Application Program Interface (API) 105, as described in U.S. Patent Application No. 62/578,886, which is incorporated herein in its entirety by this reference, for interacting and implementing complex optimization trials via the remote intelligent optimization platform 110. The API 105 may be specifically designed to include a limited number of API endpoints that reduce of complexity in creating an optimization work request, implementing optimization trials using the work request data, obtaining suggestions and/or results of the optimization trials, and potentially implementing an optimization feedback loop until a suitable optimization of an objective function of the work request is achieved in a minimal amount of time. The optimization work request, as referred to herein, generally relates to an API request that includes one or more hyperparameters that a user is seeking to optimize and one or more constraints that the user desires for the optimization trials performed by the intelligent optimization platform 110.

In a preferred embodiment, the API 105 comprises a Representational State Transfer (ReST) API that relies mainly on a stateless, client-server, cacheable communications protocol and in many cases, the Rest API uses the HTTP protocol in connecting and interacting with software applications over the web and cloud (distributed network systems) services efficiently.

Figure 4:
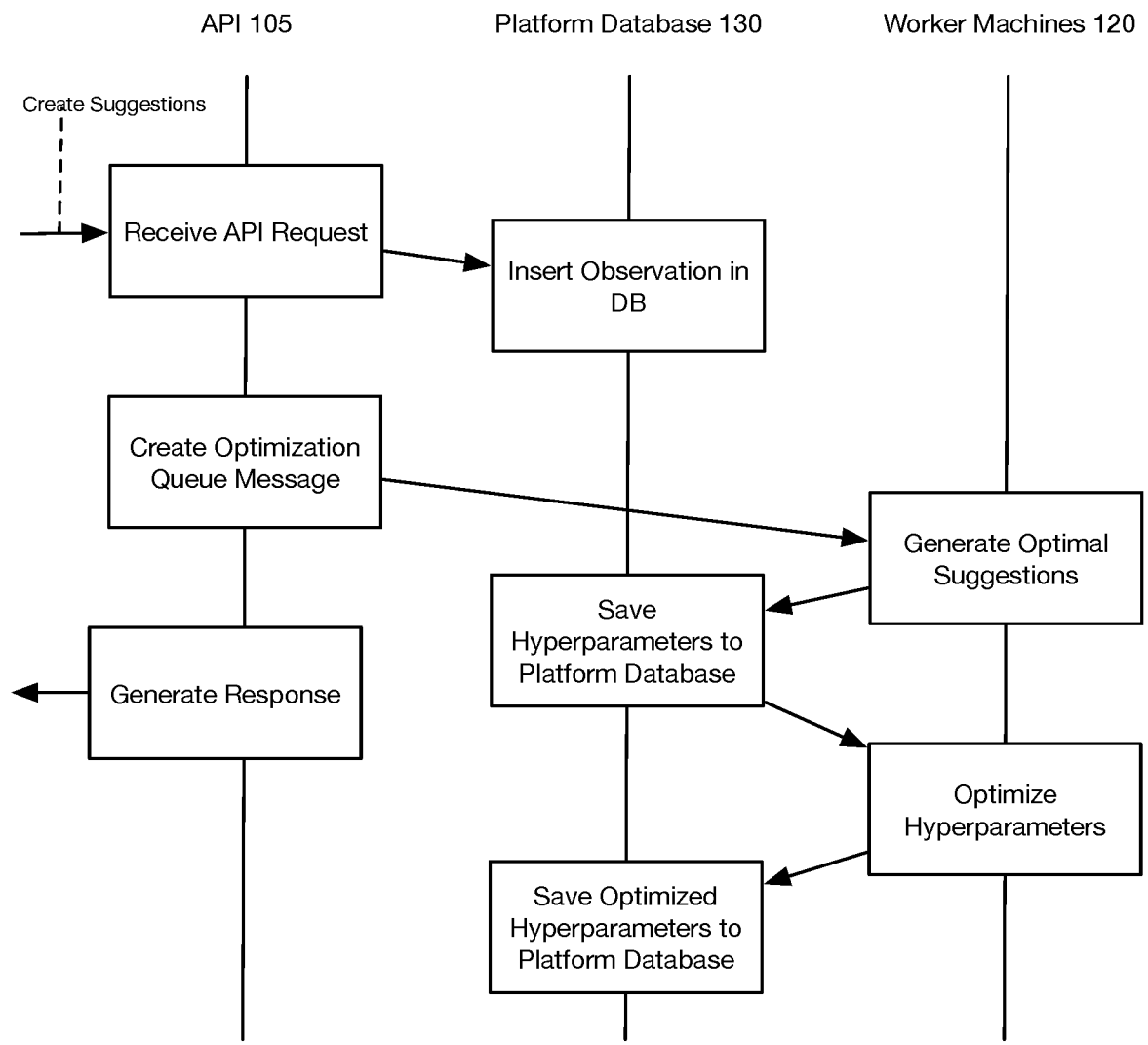
FIG. 4 illustrates schematic representation of a mixed system and process flow for implementing an intelligent optimization platform in accordance with one or more embodiments of the present application.

The API 105 may additionally be configured with logic that enables the API 105 to intelligently parse optimization work request data and/or augment the optimization work request data with metadata prior to passing the optimization work request to the shared work queue 135 of the intelligent optimization platform 110. As shown in FIG. 4, a mixed system and process flow is provided that illustrates an example interactions between the API 105 and one or more components of the intelligent optimization platform 110.

The intelligent optimization platform 110 includes the plurality of queue worker machines 120 (which may also be referred to herein as optimization worker machines), the platform data 130, the shared work queue 135 and the ensemble of optimization models 140. The intelligent optimization platform 110 generally functions to interact with the API server implementing the API 105 to receive API requests for implementing new optimization work requests and returning responses or suggestions to the API 105. Using the plurality of intelligent queue worker machines 120, the intelligent optimization platform 110 functions to asynchronously execute a plurality of optimization work requests in real-time and in parallel. This asynchronous execution and parallel processes of the intelligent optimization system 110 provides speed in computing efficiencies in the exploration and exploitation processes (generally, optimization) of features, hyperparameters, models and system architectures.

Figure 3:
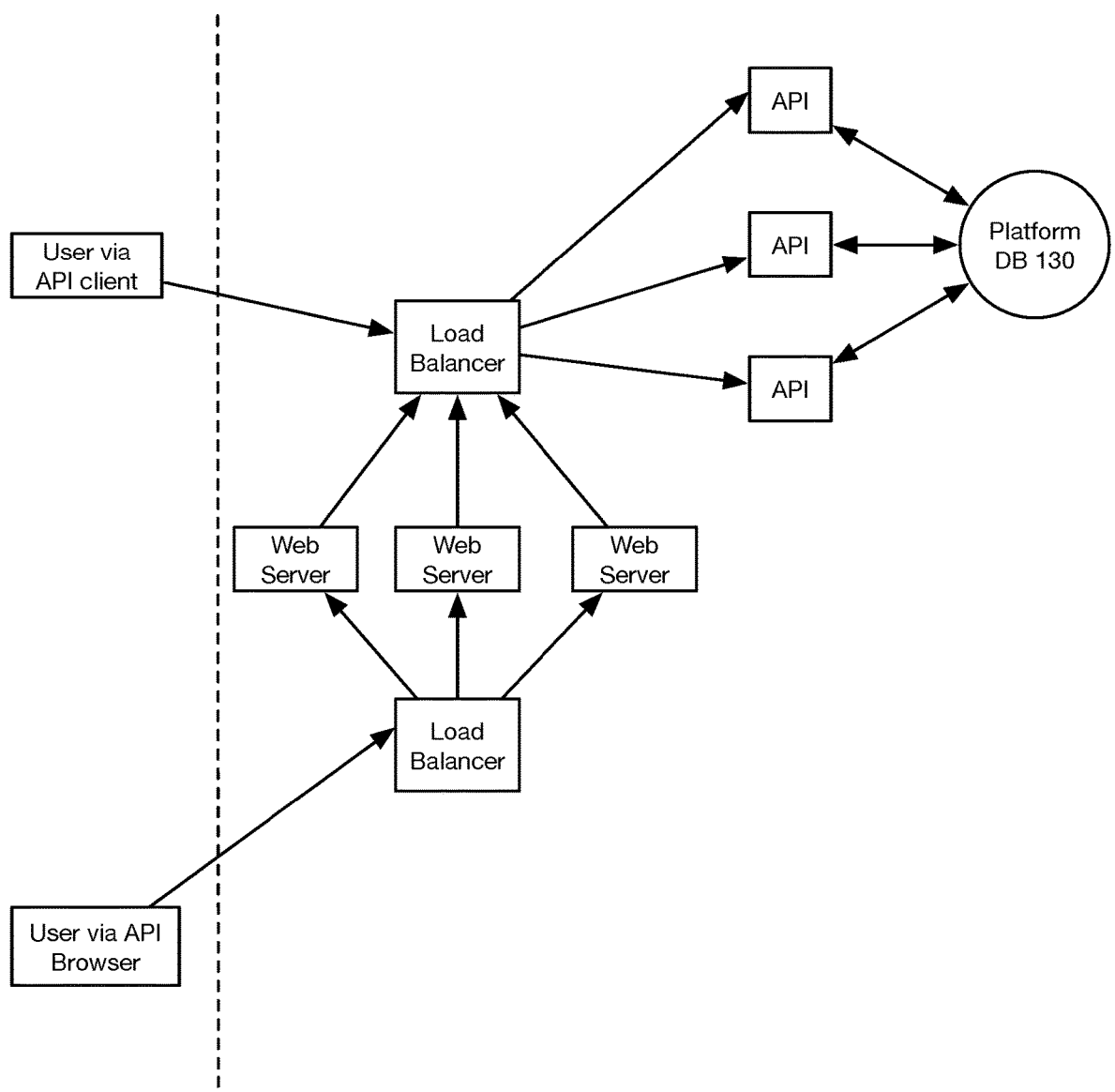
FIG. 3 illustrates a schematic representation of a system for implementing an intelligent API in accordance with one or more embodiments of the present application.

As shown by way of example in FIG. 3, the system enables a user to implement and/or interact with the API 105 in multiple ways including via an API client application and/or via API web browser implemented over the web.

The intelligent optimization platform 110 may be implemented using a combination of computing servers. Preferably, the intelligent optimization platform is implemented via a distributed networked computing system, such as cloud computing systems, that allows the many processes implemented by the intelligent optimization platform 110 to be implemented in parallel and among disparate computers thereby, in some embodiments, mitigating the possibility of failure or bottlenecking in the optimization pipeline of the intelligent optimization platform 110. Accordingly, the intelligent optimization platform 110 may be implemented as a remote web service accessible by multiple clients over the Internet, the Web, or any suitable communication network (e.g., a global area network, a wide area network, a local area network, etc.) that may function to place disparate computing resources in operable connection and communication.

The plurality of intelligent queue worker machines 120 preferably relate to services operating on the intelligent optimization platform 110 that executes code asynchronously with respect to other services or queue working machines of the platform 110. In some embodiments, each of the plurality of intelligent queue worker machines 120 functions to selectively trigger one or more optimization requests to one or more optimization engines of the ensemble of optimization engines 140. And, once the work on the optimization request is completed by the selected optimization engine(s), the queue working machine returns the responses or results to the platform database 130.

The plurality of intelligent queue worker machines 120 may be specifically configured with logic that enables each of the machines 120 to make dynamic and intelligent decisions in the selections of an ensemble component of the plurality of ensemble of optimization models 140. That is, each of the plurality of intelligent queue worker machines may function to selectively choose one or more optimization models of the ensemble 140 to execute one or more portions of an optimization work request.

The ensemble of optimization models 140 preferably includes a plurality of disparate optimization models that operate to optimize hyperparameters, features, models, system architectures and the like using varying optimization algorithms. In a preferred embodiment, the ensemble of optimization models 140 define a core optimization engine of the intelligent optimization platform 110. The features and the parameters of the core optimization engine comprising the ensemble of optimization models 140 may also be optimized continually by one or more of the intelligent queue worker machines 120 (e.g., using Hyperopt, etc.).

The ensemble of optimization models 140 may include any number of models including, for example: a Low-Discrepancy sequence model, a Metric Optimization Engine (MOE) model (and variants thereof; e.g., MOE with one-hot encoding), a Tree-structured Parzen Estimators (TPE) model and variants thereof, a Latin Hypercube model, a Swarm model, and the like. Each of these models of the example ensemble of optimization models may function to encode categorical parameters differently from other member models of the ensemble and may include some interdependencies that require combinations of the models to work together. Each of these models may be individually selectable or selectable in combination by or using the intelligent worker queue machines 120.

In a preferred embodiment, the plurality of intelligent queue working machines 120 may be implemented on a separate computing server than the API 105. In this way, long-running asynchronous processes do not adversely affect (e.g., slow down) a performance of an API computing server and mainly, a capacity of the API computing server to service API requests.

Additionally, the plurality of intelligent queue worker machines 120 include multiple, distinct intelligent queue worker machines 120 that coordinate optimization work request from the shared work queue 135 received via the API 105 with the ensemble of optimization models 140.

A first example intelligent queue working machine may function to implement Modelfit or Hyperopt that typically functions to tune one or more of the hyperparameters of the optimization models of the ensemble concurrently with the processing of the optimization work requests received via the API 105. In one implementation, Modelfit or Hyperopt may be used to tune hyperparameters of one of the optimization models of the ensemble 140. After receiving a set of observations based on the suggestions for the set of hyperparameters, the first queue worker machine may implement Modelfit or Hyperopt to model fit the hyperparameters of the selected optimization models in order to generate improved and new values for the set of hyperparameters via Nextpoints or the like. A queue worker implementing Nextpoints may function to predict or suggest a new set of suggestions that include new parameter values for a given model. In some embodiments, the first queue worker machine may function to optimize the hyperparameters of the selected optimization models based on an evaluation a set of observations returned by a user.

A second example intelligent queue working machine may function to implement Nextpoints that typically functions to generate or suggest new, optimized values for the hyperparameters of the optimization work request. Accordingly, such intelligent queue working machine may function to select one or more of the optimization models of the ensemble 140, such as one or more machine learning models, for generating the new, optimized hyperparameter values.

A third example intelligent queue working machine may function to implement an Importance algorithm that typically functions to judge or determine an importance of the hyperparameters submitted with the optimization work request (e.g., hyperparameters of an external model). This example intelligent queue worker machine may additionally function to analyze and determine an importance of features, hyperparameters, and architectures of the optimization models with respect to a given optimization work request; meaning the identified importance hyperparameters, features, or the like may have a significant impact on an account of a suggestion or generated hyperparameter values. Accordingly, the intelligent queue worker machine of such example may function to recognize different hyperparameters and/or features of an optimization model as being important and non-important based on the optimization work request data (e.g., based on the hyperparameters to be optimized). Thus, the intelligent queue worker machine may function to assign or attribute distinct importance values to the hyperparameters and/or features of the optimization models so that these hyperparameters and the like may be ranked and considered with greater weight in a correlated process, such as re-tuning via Hyperopt or the like.

It shall be noted that the plurality of intelligent optimization worker machines 120 may not be limited to the above-noted examples, but rather is an extensible group of intelligent machines that may be modified to include additional and/or different intelligent worker machines.

The platform database 130 functions to collect and stores any or all values generated by the system 100 including values generated when executing an optimization work request by the intelligent optimization platform 110. Specifically, each of the plurality of intelligent queue worker machines may function to store within the platform database 130 optimized hyperparameter values, optimized hyperparameter values of an optimization work request, suggestions, surrogate models, partial information responses, and the like. The API 105 may be operable communication with the platform database 130 via a communication network and may function to pull suggestions and/or response data via an API call or request.

The machine learning models, optimization models, and/or the ensemble of machine learning models may employ any suitable optimization algorithms and/or machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the intelligent optimization platform 110 and/or other components of the system 100.

The system 100 may additionally include a surrogate model generator (implemented via one or more of the optimization models 140) that may be implemented by the intelligent optimization platform 110. Specifically, when an API request is received by the system 100 that requests a status or suggestions of a partially completed (or incomplete) optimization work request, the intelligent optimization platform 110 may function to identify candidate data points and other data (including suggested hyperparameter values and optimized hyperparameters values) generated by each of the plurality of intelligent queue worker machines 120 for responding to the partially completed optimization work request and further, may trigger one or more of the optimization models of the ensemble of optimization models to generate a surrogate (or proxy) model that can be used to test the uncertainty and/or the likelihood that a candidate data point would perform well in an external model. In one example, the system 100 may function to obtain hyperparameter values of a most recent job of a first intelligent queue worker machine implementing Hyperopt and cause one of the optimization models 140, such as MOE, to generate the surrogate model using the hyperparameter values to test how well the candidate hyperparameter value data points may perform.

The system 100 may also implement a ranking system 155 that functions to rank multiple suggestions for a given optimization work request (or across multiple optimization work requests for a given user) such that the suggestions having hyperparameter values most likely to perform the best can be passed or pulled via the API 105. The ranking system 155 may be implemented in any suitable manner including by the one or more optimization algorithms of the ensemble 140 that generated the suggestions. For instance, if MOE is used to generate a plurality of suggestions for responding to an optimization work request, the system 100 may function to use MOE to implement the ranking system 155.

It shall be noted that the sub-systems and components of the system 100 may be connected or placed in operable communication using any suitable network and any suitable manner. For instance, the components of the system 100 may be connected directly or indirectly over a network. The network may include any public (e.g., the Internet) or private network (e.g., intranet), a virtual private network, a wireless local area network, a local area network, a wide area network, a wireless wide area network, a global area network, a cellular network, any combination of the aforementioned and the like.

2. Method for Multi-Task Accelerated Tuning of a Model

Figure 2:
FIG. 2 illustrates a method for multi-criteria optimization in accordance with one or more embodiments of the present application.

As shown in FIG. 2, a method 200 for multi-task accelerated tuning of hyperparameters of a model includes configuring a multi-task tuning work request S210, executing a multi-task tuning request S220, generating a plurality of suggestions S230, and implementing an assessment of observations S240. Optionally, the method 200 includes tuning a subscriber's model S250.

The method 200 generally functions to enable an accelerated tuning of hyperparameters of a model for optimizing one or more metrics or objectives of the model based on defining multiple distinct tuning or optimization tasks for the given model. Accordingly, the method 200 allows a configuration of a full task and correspondingly, a partial task for tuning the hyperparameters of the model which may require less computational resources and/or time for tuning. Thus, if the partial task provides a fast approximation of the true metric or true of the model, the method 200 may allow the partial task and resulting proposed hyperparameter values as a proxy for the full task. As a result, less computational resources and/or time may be needed for optimizing the model.

S210, which includes configuring a multi-task tuning work request (sometimes referred to herein as "multi-task request" or "multi-task tuning request"), may function to enable a configuration of a multi-task tuning work request via an intelligent application programming interface (API). Preferably, the intelligent API is in operable communication and/or interfaces with a remote tuning service (e.g., one or more parts of system 100), as described in U.S. Pat. No. 10,282,237, which is incorporated herein in its entirety by this reference. The intelligent API may be implemented as a client application on a client device, such as a web browser, or any suitable interface accessible to a remote user system. Within the intelligent API, the remote user may be able to create the multi-criteria optimization work request (or experiment) by providing one or more details of the objective functions or performance objectives that a user desires to optimize, hyperparameters and/or other features of machine learning model along with constraints (e.g., optimization budgets, bounds, etc.) for performing the optimization trials by the intelligent optimization platform. While it is preferable that the intelligent API may be implemented for configuring and/or generating a tuning work request, any suitable computer-based interface may be used to configure a multi-task tuning work request.

In one or more embodiments, a multi-task tuning work request preferably includes a multi-part (API) request for tuning hyperparameters of a model of a subscriber to the tuning service. At the tuning service, executing the multi-part tuning request operates to optimizes a true metric and/or true objective of the model. Preferably, the multi-part tuning request operates to initialize one or more operations of the tuning service for automatically tuning parameters of a model that optimizes a single metric or single objective of the model; however, it shall be noted that, in some embodiments, the tuning service may operate to tune hyperparameters of the model for optimizing multiple metrics and/or multiple objectives of the model, as described in U.S. Provisional Application No. 62/721,718, which is incorporated herein in its entirety by this reference.

Accordingly, in some embodiments, the multi-task tuning work request includes a firstly defined full task or unabridged task and at least a secondly defined partial or abridged task. It shall be noted that while a multi-task tuning work request may be defined to include a first full task and a second partial task or the like, in one or more embodiments, multiple partial tasks (including a secondary task, a tertiary task, and the like) may be defined or configured via the intelligent API.

In one or more embodiments, the full task or the unabridged task as referred to herein preferably relates to an optimization task or a tuning performed by the tuning service of parameters of a model that is executed at a full cycle of optimization or tuning. That is, in such embodiments, a full task is not abbreviated relative to a partial task, which may be abbreviated relative to the full task. Accordingly, in the case of a full task, a full time or full cycle and/or full tuning resources (including data and/or other computing resources) may be deployed when tuning hyperparameters associated with the full task.

A partial task or an abridged task as referred to herein preferably relates to a tuning assignment to the tuning service that is performed or completed within less time and/or less computing resources than required for a typical cycle and/or tuning assignment. Specifically, in a preferred embodiment, the partial task or an abridge task is determined relative to a full task by which a standard or typically tuning time and/or standard tuning resources are determined. Accordingly, a partial task may additionally or alternatively be defined In a preferred embodiment, S210 enables a defining of a full task for tuning hyperparameters of a subscriber model by setting tuning parameters of a multi-task tuning work request in a predetermined manner. For instance, in such embodiments, S210 includes defining a full task (unabridged) by setting a tuning cost parameter via the intelligent API or the like to an integer, which indicates to the system that a standard and/or unabridged tuning or optimization of hyperparameters of the subscriber model identified within the multi-task tuning request should be performed. Additionally, or alternatively, the tuning cost parameter of a multi-task tuning request governs and/or controls extent to which a tuning is performed along one or more tuning operations and/or tuning resources. For instance, The tuning cost parameter of a multi-task tuning request preferably operates to set a mode of operation of the tuning service. Specifically, in some embodiments, the tuning service may function to operate in multiple modes for tuning and/or optimizing hyperparameters. In the circumstance that an integer (e.g., 1, 2, 3, or the like) is set at the tuning cost parameter for a given task of a tuning request, automatically enables a full task mode for executing the tuning work request. In circumstances in which a non-integer value may be set to the tuning cost parameter via the intelligent API, the tuning service may be set to a partial task mode for executing the tuning work request. Accordingly, the tuning service may function to toggle between the distinct modes (i.e., full-task mode and partial-task mode, etc.) of operation and/or in some embodiments, may function to operate both modes simultaneously in the case of a multi-task tuning request that includes a full task and a partial task.

In a preferred embodiment, S210 enables a defining of a partial (accelerated) task for tuning hyperparameters of the subscriber model by setting tuning parameters of the multi-task tuning work request in a second predetermined manner that is distinct from the predetermined manner or settings for defining the full task. In such preferred embodiment, S210 may function to enable the partial task by setting a value at a tuning cost parameter of a multi-task tuning request to a non-integer value (e.g., 0.1, 0.2, 0.3, or the like).

It shall be noted that while a tuning mode of the tuning service may preferably be set based on an integer and/or a non-integer value at the tuning cost parameter, any suitable value or indicator including percentage values (e.g., 100%=full, 40%=partial or the like), non-numerical values or characters (e.g., Yes=full, No=partial; A=full, B=partial).

In some embodiments, a non-integer value set at the tuning cost parameter may function to define an extent (relative to the full task) of a partial task of a multi-task tuning request. In a first example of a multi-task tuning work request, an objective may be set for maximizing an accuracy of a gradient descent algorithm or the like. In this first example, for optimizing the accuracy of the gradient descent algorithm, a full training and/or tuning at ten (10) epochs may be required. Accordingly, by setting an integer value of one (1) for example as the tuning cost in a multi-task tuning request, a system implementing the method 200 (e.g., the tuning service or the system 100) may perform a full tuning and/or optimization of the gradient descent model consisting of all 10 epochs. Correspondingly, by setting a non-integer value (e.g., 0.2, etc.) as the tuning cost for at least a second, partial task of the multi-task tuning request, a system implementing the method 200 may function to perform an accelerated or partial tuning of the gradient descent model of consisting of 2 of the 10 epochs (i.e., 0.2 of 1).

In yet a second example of a multi-task tuning work request, an objective of a tuning work request may be set for maximizing a training accuracy of a supervised machine learning model or the like. In such second example, a training dataset may include ten thousand (10,000) labeled examples that may be available for training the supervised machine learning model. To enable a full task training of the supervised machine learning model using an entirety of the corpus of labeled examples, an integer value may be set at the tuning cost parameter of a multi-task tuning work request. Additionally, to enable an accelerated or faster partial task for training the supervised machine learning model, a non-integer value less than one (1) or less than the integer value for the full task training may be set. In such partial task training, the multi-task tuning cost for the partial training of the supervised machine learning model may be used to determine a subset or sample amount of the training corpus that may be used for an accelerated training of the model. In such example, an amount of the training corpus that may be sampled for tuning the model in the partial task may be computed based on a percentage or fraction of the tuning cost for the partial task multiplied the tuning cost for the full task. For example, if a partial tuning cost is set at 0.1 and the full tuning cost is set at 1 for a training corpus including 10000 labeled examples, then a sampling of one thousand (1000) labels, which is a 10% fraction of the dataset (training corpus), may be used from the training corpus for an accelerated, partial task or tuning of the supervised machine learning model.

It shall be noted that a given tuning cost parameter for a partial task may operate to affect any suitable or custom measure of cost. For instance, the tuning cost parameter may affect a granularity of a simulator or tuning source that is used in a tuning operation of a partial task such that the simulator or tuning source is used at a cheaper cost than the full task.

Additionally, or alternatively, S210 enables a defining and/or setting of an observation and/or tuning budget. In one or more embodiments, a value may be set for the tuning budget via the intelligent API. The tuning budget preferably indicates a number of suggestions (e.g., distinctly generated values for hyperparameters of a model or the like) expected as a result of the tuning by the tuning service.

S220, which includes executing a multi-task tuning request, may include executing each of the first full task and the one or more additional partial tasks of the multi-task tuning request. In a preferred embodiment, executing the multi-task tuning request may function to trigger and/or initialize a distinct mode of operation at the tuning service varying from a standard mode of operation. Specifically, in one or more embodiments, an identified value set for a tuning cost parameter of a given tuning task may operate to trigger (or cause) the tuning service to switch from a standard tuning mode of operating (or other available operating modes) to a multi-task tuning mode that allows the tuning service to perform a standard tuning of the full task and an accelerated tuning of each partial task of the multi-task tuning request.

Additionally, or alternatively, S220 may include manipulating a corpus of data (i.e., tuning or optimization data) available for the tuning process based on the one or more partial tasks of the multi-task tuning request. In some embodiments, manipulating the corpus of data includes randomly sampling or subsampling the corpus of data to define a distinct dataset for an accelerated tuning of the one or more partial tuning tasks. In some embodiments, manipulating the corpus of data includes intelligently partitioning the corpus of data to best fit the requirements or a size of a partial task. That is, in such embodiments, if a partial task is 10%, for example, of a full task, S220 may function to partition 10% of the data from a corpus of tuning data and set the partition as the dataset available for tuning the partial task. In some embodiments, manipulating the corpus of data may include setting or defining a number of times an epoch may be implementing for tuning or training based on the tuning cost associated with the partial task.

Additionally, or alternatively, S220 may function to dynamically set and/or configure exploration and exploitation parameters for a tuning associated with each partial tuning task of a multi-task tuning request. Exploration parameters preferably enable the tuning service to identify potential hyperparameter values for a given model. Exploitation parameters preferably enable the tuning service to select and evaluate one or more of the identified potential hyperparameter values for the given model. In one or more embodiments, S220 may function to dynamically set or balance exploration and exploitation parameters for a given partial task based on one or more a tuning cost parameter associated with the given partial task, a size of the tuning budget, a size of a corpus of tuning data, and a number of additional partial tasks associated with the multi-task tuning request (collectively may be referred to herein as "rebalancing factors"). Accordingly, depending on one or more factors, S220 may increase or decrease an associated exploration and exploitation for a given partial task during execution of the tuning for the given partial task.

Accordingly, a dynamic balancing or re-balancing of exploration parameters and exploitation parameters for a partial task may automatically cause a re-selection of one or more distinct tuning and/or optimization sources of the tuning service. That is, in one or more embodiments, one or more tuning sources may be configured for exploring a parameter space or exploring potential values for one or more hyperparameters of tuning work request and one or more distinct tuning source may be configured for exploiting or evaluating the one or more potential hyperparameter values identified in the parameter space. Thus, based on the dynamic balancing of exploration and exploitation for a given partial task, the tuning sources of the tuning service used in executing one or more tuning tasks for the given partial tuning task may also shift dynamically or in parallel with shifts in the balance of exploration and exploitation.

S230, which includes generating suggestions, may function to generate proposed hyperparameter values based on an execution of the multi-task tuning request. In one or more embodiments, S230 may function to generate a first and/or a full suggestion set for a full task and one or more additional partial suggestion sets for each partial task of a multi-task tuning request.

Additionally, or alternatively, for each suggestion of a suggestion set, S230 may function to generate and assign a unique suggestion identifier (ID) and additionally, or alternatively, include a task name together with a tuning cost value.

Additionally, or alternatively, generating suggestions and/or tuning each (full or partial) task of a multi-task tuning request may include testing and/or evaluating suggestions. Specifically, in one or more embodiments, S230 may function to construct a surrogate model representing a hypothetical architecture or a hypothetical construction of a real-world architecture of a subscriber model. That is, in or more embodiments, an architecture of a subscriber's real-world model may not be known and in such embodiments, S230 may function to construct the surrogate model, which is a best-guess or best-approximation of the characteristics of the subscriber's model that is produced by the tuning service.

In such embodiments, S230 may function to test and/or evaluate each suggestion with the surrogate model. Accordingly, in some embodiments, S230 may function to further accelerate a tuning of hyperparameters by testing multiple distinct suggestions simultaneously. That is, S230 may function to deploy parallel testing of each proposed suggestion thereby speeding up a rate at which suggestion sets may be created for each partial or full task of a multi-task tuning request.

Additionally, or alternatively, at each instance that a suggestion set is generated for either of the full task or the partial task, S230 may function to electronically associate the suggestion set to either the full task or the partial task (whichever task for which the suggestion set was generated for). In this way, based on an assessment of the data associated with the suggestion set, S230 may function to intelligently select between executing a new tuning operation with either the full task or the partial task. That is, based on a performance and/or quality of the suggestion set, S230 may function to intelligently decide to perform additional tuning operations with the full task or partial task having suggestion sets with higher quality or higher performance results. Additionally, or alternatively, an assessment of the suggestion set may function to inform a selection and/or sampling of a source of data used in the tuning operations. In such instances, if an assessment of the suggestion indicates that the suggestion set is insightful towards a measured metric or objective of the subject model, then S240 may function to selectively sample data from the source of data for a new tuning operation that is similar or like the data used in the tuning operation for the suggestion set. Conversely, if the suggestion set is not insightful, S240 may function to select dissimilar or unlike data from the source of data than the kind of data that was used when generating the suggestion set.

S240, which includes implementing an assessment of observations, may function to identify observations returned to the tuning service from a subscriber to the tuning service. In such embodiments, the one or more observations returned may be based on the suggestion sets for each of the tasks of a multi-task tuning request. The observations preferably relate to a real-world results or performance of a subscriber's model based on the suggestion sets generated for each of the tasks of the multi-task request. That is, in one or more embodiments, a subscriber may function to implement suggested hyperparameters in a real-world or live version of its model and record a performance and/or results thereof and return via the intelligent API or the like, the performance metrics and/or result metrics.

Additionally, or alternatively, each observation returned preferably includes its unique suggestion ID, as originally generated and assign to each suggestion by the tuning service. In this way, S240 may function to distinctly identify and/or distinctly track the performances of distinct suggestions for each of the full task and partial task(s) of a multi-task tuning request.

Additionally, or alternatively, the assessment of observations may include determining whether the suggestion set(s) provided for a partial task of a multi-task tuning request provides useful and/or meaningful insights towards a measured metric and/or a measured objective of a subscriber model. That is, in one or more embodiments, S240 may function to measure a performance and/or determine a performance metric for each suggestion associated with a returned observation. In one or more embodiments, S240 may function to specifically measure a performance of suggestions resulting from executing a partial task during tuning.

Additionally, or alternatively, S240 may function to assess the measured performance of a suggestion resulting from the tuning associated with a subject partial task against a predetermined performance threshold or a desired performance threshold. Accordingly, in such embodiments, if in S240 it is determined that the measured performance of the suggestion of the subject partial task satisfies or exceeds the performance threshold, S240 may function to set the subject partial task (and its associated tuning parameters or the like) as an accelerated proxy for the full task. In such instances, in lieu of performing a tuning of a full task, S240 may function to execute one or more partial tasks in future tuning sessions at the tuning service based on the parameters of the subject partial task. Thus, a search of the parameter space associated with the subject partial task may be performed in future tuning sessions.

Additionally, if in S240 it is determined that the measured performance of the suggestion of a subject partial task does not satisfy or exceed a set performance threshold, S240 may function to disregard the subject partial task and, in some embodiments, resets tuning parameters for the subject partial task or otherwise, block similar or same tuning parameters of the subject partial task from future iterations or tunings of other partial tasks for a given multi-task tuning request.

Optionally, S250, which includes tuning a (machine learning) subscriber's model, functions to use the generated or suggested identified hyperparameter values (derived from a tuning with a partial task of a multi-task tuning request) for tuning and/or otherwise, adjusting a subject model. In this regard, in one or more embodiments, the identified hyperparameter values for the subject model may function to optimize one or more objectives of the subject model. Any suitable or type of objective of a subject model may be optimized including, but not limited, a training accuracy, a predictive accuracy, an operating efficiency and/or speed (e.g., predictive speed, etc.), minimizing a use of computing resources, and/or the like.

One or more instances of the method and/or processes described herein can be performed asynchronously (e.g., sequentially), concurrently (e.g., in parallel), or in any other suitable order and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A system to accelerate tuning of hyperparameters, the system comprising:
   memory;
   programmable circuitry; and
   instructions in the memory to cause the programmable circuitry to:
   access a multi-task tuning work request to tune hyperparameters of a model of a subscriber to a tuning service, the multi-task tuning work request to include:
   (i) a full tuning task to tune the hyperparameters of the model, the full tuning task to include first tuning parameters governing a first tuning operation of the tuning service; and
   (ii) a partial tuning task to tune the hyperparameters of the model, the partial tuning task to include second tuning parameters governing a second tuning operation of the tuning service;
   during the first tuning operation, provide as input to tune the model a corpus of training data based on one or more of the first tuning parameters of the full tuning task;
   execute the first tuning operation of the full tuning task based on the first tuning parameters;
   during the second tuning operation, sample a subset of the corpus of training data as input to tune the model based on one or more of the second tuning parameters of the partial tuning task;
   execute the second tuning operation of the partial tuning task based on the second tuning parameters;
   generate a first suggestion set, the first suggestion set to include one or more first proposed values for the hyperparameters based on the execution of the full tuning task; and
   generate a second suggestion set, the second suggestion set to include one or more second proposed values for the hyperparameters based on the execution of the partial tuning task,
   wherein after an identified performance metric of the model using the one or more second proposed values for the hyperparameters corresponding to the partial tuning task satisfies a performance threshold, set the partial tuning task as a proxy for the full tuning task to accelerate tuning of the hyperparameters of the model.

2. The system according to claim 1, wherein the second tuning operation of the partial tuning task is an abbreviated tuning operation relative to the first tuning operation of the full tuning task, the abbreviated tuning operation to use one or more of less time for execution or less computing resources for execution.

3. The system according to claim 1, wherein the programmable circuitry is to collect observation data, the observation data to include a real-world performance of the one or more second proposed values for the hyperparameters of the second suggestion set.

4. The system according to claim 1, further including:
   an application programming interface that is in operable communication with the tuning service, the application programming interface to:
   configure the multi-task tuning work request, the configuring of the multi-task tuning work request to include:
   defining the first tuning parameters for the full tuning task, and
   defining the second tuning parameters for the partial tuning task.

5. The system according to claim 1, wherein:
   the first tuning parameters for the full tuning task include a first tuning cost parameter having an integer value; and
   the second tuning parameters for the partial tuning task include a second tuning cost parameter having a non-integer value.

6. The system according to claim 1, wherein the multi-task tuning work request includes a plurality of distinct partial tasks, ones of the distinct partial tasks are associated with a distinct tuning cost parameter having a non-integer value.

7. The system according to claim 1, wherein the tuning service is to: simultaneously assess ones of the one or more second proposed values for the hyperparameters of the second suggestion set to accelerate the tuning of the hyperparameters of the model.

8. The system according to claim 7, wherein the programmable circuitry is to construct a surrogate model that is an approximation of the model of the subscriber, the assessing of the ones of the one or more second proposed values for the hyperparameters of the second suggestion is performed via the surrogate model.

9. The system according to claim 1, wherein after the partial tuning task is set as the proxy for the full tuning task, the programmable circuitry is to search only a parameter space of the partial tuning task for new proposed values for the hyperparameters of the model.

10. The system according to claim 1, wherein the programmable circuitry is to:
    during the first tuning operation, provide as input to tune the model a predetermined number of epochs based on one or more of the first tuning parameters of the full tuning task; and
    during the second tuning operation, provide a number of epochs less than the predetermined number of epochs as input to tune the model based on one or more of the second tuning parameters of the partial tuning task.

11. A method to accelerate tuning of hyperparameters, the method comprising:
  receiving at a tuning service a multi-task tuning work request to tune hyperparameters of a model of a subscriber to the tuning service, the multi-task tuning work request including:
    (i) a full tuning task to tune the hyperparameters of the model, the full tuning task to include first tuning parameters governing a first tuning operation of the tuning service, the first tuning parameters for the full tuning task include a first tuning cost parameter having an integer value; and
    (ii) a partial tuning task to tune the hyperparameters of the model, the partial tuning task to include second tuning parameters governing a second tuning operation of the tuning service, the second tuning parameters for the partial tuning task include a second tuning cost parameter having a non-integer value;
  executing the first tuning operation of the full tuning task based on the first tuning parameters;
  executing the second tuning operation of the partial tuning task based on the second tuning parameters;
  generating a first suggestion set, the first suggestion set to include one or more first proposed values for the hyperparameters based on the execution of the full tuning task; and
  generating a second suggestion set, the second suggestion set to include one or more second proposed values for the hyperparameters based on the execution of the partial tuning task,
  wherein after an identified performance metric of the model using the one or more second proposed values for the hyperparameters corresponding to the partial tuning task satisfies a performance threshold, setting the partial tuning task as a proxy for the full tuning task to accelerate tuning of the hyperparameters of the model.

12. The method according to claim 11, further including:
  implementing an application programming interface that is in operable communication with the tuning service, the application programming interface to:
  configure the multi-task tuning work request, the configuring of the multi-task tuning work request to include:
    defining the first tuning parameters for the full tuning task, and
    defining the second tuning parameters for the partial tuning task.

13. The method according to claim 11, further including when the partial tuning task is set as the proxy for the full tuning task, searching only a parameter space of the partial tuning task for new proposed values for the hyperparameters of the model.

14. The method according to claim 11, further including dynamically rebalancing by tuning service exploration parameters and exploitation parameters of the second tuning operation based on one or more rebalancing factors associated with the partial tuning task.

15. A computer-readable storage device comprising instructions that, when executed, cause programmable circuitry to at least:
  access, at a machine learning-based tuning service, a multi-task tuning work request to tune hyperparameters of a machine learning model of a subscriber to the machine learning-based tuning service, the multi-task tuning work request to include:
    (i) an unabridged tuning task to tune the hyperparameters of the machine learning model, the unabridged tuning task to include first tuning parameters governing a first tuning operation of the machine learning-based tuning service; and
    (ii) an abridged tuning task to tune the hyperparameters of the machine learning model, the abridged tuning task to include second tuning parameters governing a second tuning operation of the machine learning-based tuning service;
  execute the first tuning operation of the unabridged tuning task based on the first tuning parameters;
  execute the second tuning operation of the abridged tuning task based on the second tuning parameters, the first tuning operation for the unabridged tuning task performed jointly with the second tuning operation for the abridged tuning task;
  generate a first suggestion set, the first suggestion set to include one or more first proposed values for the hyperparameters based on the execution of the unabridged tuning task; and
  generate a second suggestion set, the second suggestion set to include one or more second proposed values for the hyperparameters based on the execution of the abridged tuning task,
  wherein after an identified performance metric of the machine learning model using the one or more second proposed values for the hyperparameters corresponding to the abridged tuning task satisfies a performance threshold, set the abridged tuning task as a proxy for the unabridged tuning task to accelerate tuning of the hyperparameters of the machine learning model.

16. The computer-readable storage device according to claim 15, wherein at instances at which third suggestion sets are generated for the unabridged tuning task or the abridged tuning task, the instructions are to cause the programmable circuitry to:
  electronically associate ones of the third suggestion sets to either the unabridged tuning task or the abridged tuning task; and
based on an assessment of data associated with one of the third suggestion sets, (a) perform a new tuning operation by selecting one of the unabridged tuning task or the unabridged tuning task and (b) selectively sample a source of data for the new tuning operation.

* * * * *